T. J. RITTER, Jr., AND B. M. WARN.
LEVER HOLDING MECHANISM FOR AUTOMOBILES.
APPLICATION FILED APR. 18, 1919.
1,328,899.
Patented Jan. 27, 1920.
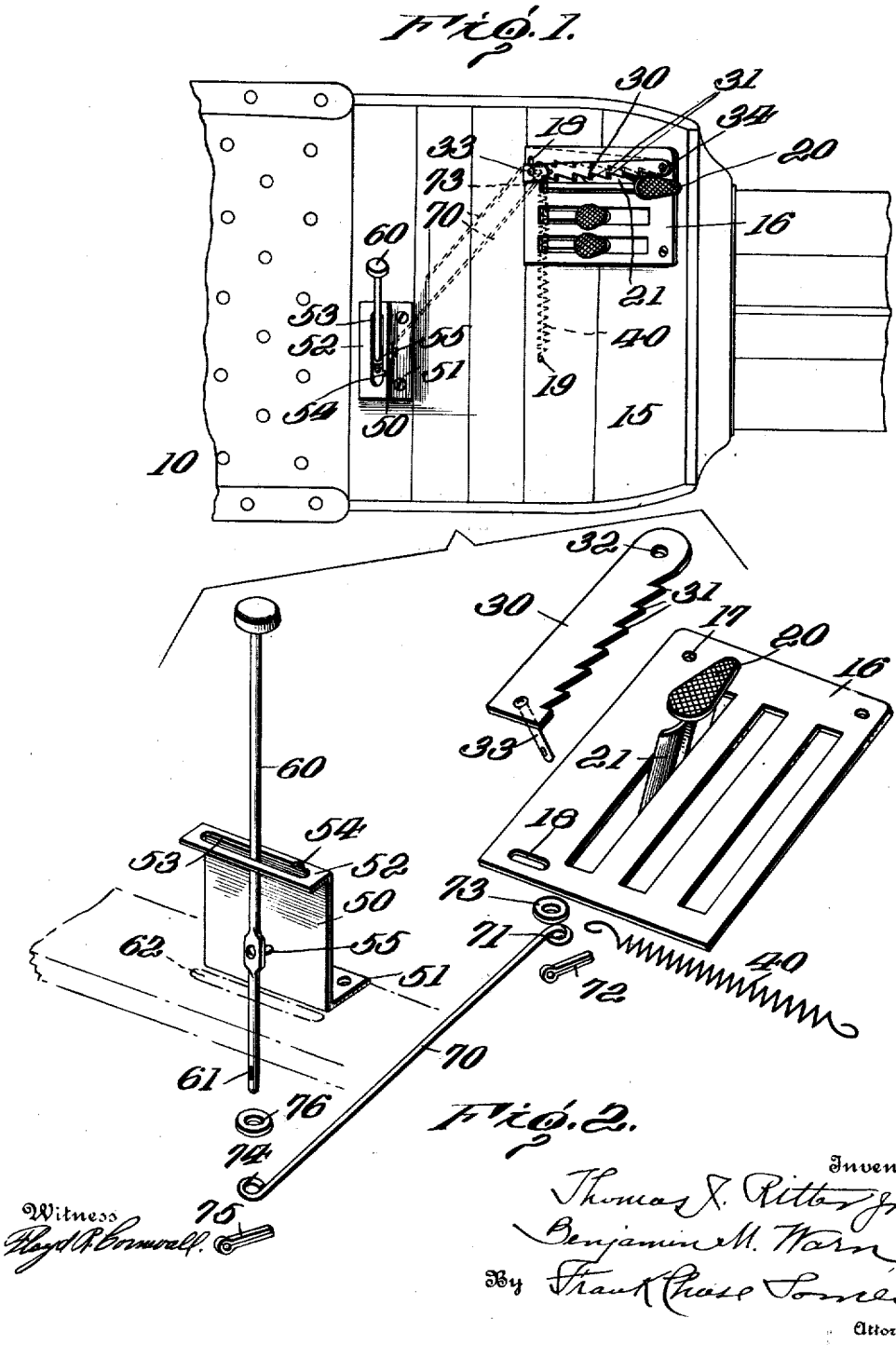

UNITED STATES PATENT OFFICE.

THOMAS J. RITTER, JR., AND BENJAMIN M. WARN, OF LAIRDSVILLE, PENNSYLVANIA.

LEVER-HOLDING MECHANISM FOR AUTOMOBILES.

1,328,899.

Specification of Letters Patent.   Patented Jan. 27, 1920.

Application filed April 18, 1919.   Serial No. 291,002.

*To all whom it may concern:*

Be it known that we, THOMAS J. RITTER, Jr., and BENJAMIN M. WARN, citizens of the United States of America, and residents of Lairdsville, in the county of Lycoming, in the State of Pennsylvania, have invented certain new and useful Improvements in Lever-Holding Mechanism for Automobiles, whereof the following is a specification.

In certain automobiles, especially of the Ford type, the speed is regulated by the position of a power or clutch lever operated by the foot, said lever having three positions, an intermediate or neutral position in which the clutch is disengaged, a rearward position in which the high speed gear is operative and a forward position in which the low speed gear is operative. In the forward position of slow speed for hill climbing a constant pressure is required to maintain the lever at low gear. This results in strain and weariness to the driver where hilly or bad roads are traveled.

This invention relates to a power lever holding mechanism for automobiles, which is shiftable into operative or inoperative position, and which acts automatically when in operative position to hold the power lever in the desired fixed position, and when shifted to inoperative position becomes totally disengaged from said lever, whereby the latter may be operated in the usual way for any period of time without frequent adjustment of the holding mechanism.

Figure 1 of the accompanying drawings represents a plan view of the front portion of the body of an automobile of the Ford type, showing the preferred embodiment of this invention.

Fig. 2 represents in a diagrammatic perspective the several added elements, together with the lever plate and power lever of a Ford car.

The same reference numbers indicate corresponding parts in both figures, the principal parts being designated by round numbers and the subordinate features thereof by intermediate numbers.

In the illustrated embodiment of the invention certain features of the usual construction of a Ford car are shown; namely a body 10 provided with a foot board 15, a slotted lever plate 16 attached to said foot board, and a power or clutch foot lever 20 which projects through and plays in the left hand slot of said foot board and lever plate, and is movable from neutral into high or low gear position in the usual manner.

In the application of this invention there is added to the well known elements above referred to a swinging member or rack 30 pivoted adjacent to the power lever 20 and adapted to swing into and out of engagement therewith. This rack is provided along its inner edge with ratchet teeth 31, at its upper end with a hole 32 and at its lower end with a fixed downward stud 33. A pivot bolt 34 secures the rack bar to the foot board 15, said bolt passing through the hole 32 of the rack and through a hole 17 in the lever plate 16 and foot board 15. The stud 33 projects through a slot 18 in the lever plate and foot board. A contractile spiral spring 40 is connected at one end with a fixed stud 19 on the underside of the foot board some distance to the right of the lever plate and at the other end with the stud 33 on the swinging rack 30. This spring tends to swing the rack 30 toward the lever 20 and to cause it to automatically engage said lever. The member or rack 30 is always free to swing on its pivot except when shifted out of contact with the lever 20 as hereinafter described and is constantly subject to the action of the spring 40 during its engagement with the lever 20. The lever is preferably provided with a catch plate 21 which facilitates the engagement therewith of the movable rack 30.

Means are provided for shifting the toothed member or rack 30 out of position for engagement with the lever 20 and for locking said rack in such inoperative position. The means shown for this purpose are mounted independently of said toothed member and comprise a spring bracket 50, a hand lever 60 pivoted thereto and a rod 70 connecting the stud 33 of the swinging rack with said lever. The spring bracket 50 is constructed of sheet metal and is provided with a bottom flange 51 and a top flange 52. This bracket is secured to a floor board of the body 10 by screws passing through the bottom flange 51. The top flange 52 has a slot 53 and a notch 54 at one end of said slot. The body of the spring bracket is provided with a stud 55. The hand lever 60 is fulcrumed on said stud and plays near its upper end in said slot 53. The lower end of this lever projects through a slot 62 in the floor of the body 10. The rod 70 is provided at one end with an eye 71 which is engaged by the stud 33 of the movable rack 30, a cotter pin 72 passing through said stud below said eye and a washer 73 being disposed on said stud between said cotter pin and the underside of the foot board. The opposite end of said rod is provided with an eye 74 through which the lower end of the hand lever 60 projects and a cotter pin 75 is passed through a hole 61 in said hand lever below the eye 74 of said rod 70 and a washer 76 is disposed on said hand lever between said cotter pin and the underside of the floor.

The device is applied to a Ford car by simply removing the center floor board, cutting a slot at the lower left hand corner of the lever plate and swinging the ratchet from the upper left hand corner thereof; then attaching the spring bracket carrying the actuating hand lever.

The devices constituting this lever holding mechanism are very simple and may be applied to an automobile already in use without the aid of a skilled mechanic.

In the use of this invention, the lever holding mechanism is placed in operative position by swinging the hand lever 60 toward the left and the movable rack 30 is then subject to the tension of the spring 40. As the power or clutch lever 20 is pushed forward to throw the clutch on low gear, the catch plate 21 thereof moves up over the upwardly inclined ratchet teeth 31 of said rack, and when said lever reaches the desired position, the operator releases the lever and one of the teeth of said rack engages said catch plate and holds the lever in the adjusted position. The operator is thus relieved of the foot pressure and leg strain incident to the ordinary operation of such lever. When it is desired to shift the lever to neutral or high gear position a swing of the hand lever to the right will disengage the rack bar from the foot lever. When it is desired to hold the rack bar out of engagement with the foot lever, the hand lever 60 is swung to the right and the spring action of the spring bracket 50, causes the notch of the latter to engage the hand lever and lock the holding mechanism out of operative position.

The details of the mechanism herein described may be varied without departure from the spirit or scope of the invention.

We claim as our invention:

1. The combination of a floor plate having a slot, an automobile speed control lever playing in said slot, a swinging toothed member pivoted adjacent to said slot and adapted to swing in a plane substantially parallel with said plate into and out of engagement with said lever, a spring mechanism operative to yieldingly hold said toothed member normally in engagement with said lever, and means mounted independently of said toothed member for shifting it out of engagement with said lever.

2. The combination of a floor plate having a slot, an automobile speed control lever playing in said slot, a swinging toothed member pivoted adjacent to said slot and adapted to swing in a plane substantially parallel with said plate into and out of engagement with said lever, a spring mechanism operative to yieldingly hold said toothed member normally in engagement with said lever, and self locking means mounted independently of said toothed member for shifting it out of engagement with said lever.

3. The combination of a slotted foot board, a control lever movable in a slot thereof, a rack bar pivoted adjacent to said slot and adapted to swing into engagement with said lever, a spring normally holding said swinging rack in engagement with said lever, a notched spring bracket, a lever engaged by said spring bracket, and a rod connecting said lever with said spring rack.

THOMAS J. RITTER, Jr.
BENJAMIN M. WARN.